Patented Dec. 8, 1936

2,063,147

UNITED STATES PATENT OFFICE 2,063,147

VAT OR SULPHUR DYESTUFF PREPARATION

Hermann Berthold, Leverkusen-on-the-Rhine, Germany, assignor to General Aniline Works, Inc., New York, N. Y., a corporation of Delaware No Drawing. Application June 19, 1931, Serial No. 545,622. In Germany June 27, 1930

2 Claims. (Cl. 8—6)

The present invention relates to new vat or sulphur dyestuff preparations suitable for printing purposes, to a process of printing textile fibres with these preparations and to the printed fabrics obtainable by the application of said dyestuff preparations.

In accordance with the invention anthraquinone sulphonic or carboxylic acids or substitution products thereof or reduction products of these substances, which still contain oxygen in the meso-position, or mixtures of compounds of these types are employed to influence favorably the capacity for printing of vat and sulphur dyestuffs, that is, to improve the strength of the printings obtainable, and at the same time the speed of fixation.

Instead of the free sulphonic or carboxylic acids, salts thereof, such as the alkali metal- or ammonium salts may be applied, which salts are to be considered equivalents to the free acids.

Suitable anthraquinone-sulphonic- or -carboxylic acids are, for example, anthraquinone-1- or -2-sulphonic acid, anthraquinone-1.5- or -1.8-disulphonic acid, anthraquinone-2.6- or 2.7-disulphonic acid, anthraquinone-1- or -2-carboxylic acid, anthraquinone-1.5-dicarboxylic acid, etc.

The further addition of anthraquinone, hydroxyanthraquinones, aminoanthraquinones or of reduction products of these compounds containing oxygen in the meso-position, enhances the efficacy of the first mentioned products in many cases.

The anthraquinone derivatives mentioned and likewise the reduction products of these substances, as far as they are difficultly soluble in water, are preferably applied in a finely divided state for the purposes of the present process. This may be accomplished in a variety of ways. Thus, for example, the substances in question may be finely ground or they may be dissolved in sulphuric acid and reprecipitated with water or, insofar as they are soluble in alkali, they may be dissolved in caustic alkalies, for example, in caustic soda solution and reprecipitated with mineral acids.

The incorporating of the anthraquinone sulphonic or carboxylic acids or their reduction products containing oxygen in the meso-position with the dyestuffs, may be accomplished in a variety of ways. For example, the different constituents may be mixed in the dry state or in form of aqueous pastes; or, the anthraquinone-sulphonic or carboxylic acids may be added to the printing colors at any stage of their manufacture. The best results are generally obtained when adding the anthraquinone sulphonic or carboxylic acids to aqueous pastes of the dyestuffs containing glycerine or another similar water soluble polyvalent alcohol, such as glycol, thiodiglycol, thiodiglycerol and the like. The pastes thus obtainable are very stable, do not deposit or dry up, do not form crusts and can be applied for printing purposes even after prolonged storing. In some cases it will be of advantage to work in the following manner: The dyestuff is suspended in water, glycerine or another similar water soluble polyvalent alcohol as mentioned above, and an alkali, such as caustic soda solution, caustic potash solution, or preferably a weaker alkali, such as ammonia, sodium carbonate, potassium carbonate or the like, is added, and the dyestuff is reduced in this suspension by means of a reducing agent customarily employed in vat dyeing, such as an alkali metal hydrosulphite, titanium trichloride etc. An anthraquinone sulphonic or carboxylic acid or a reduction product thereof containing oxygen in the meso-position is added to the preparations above mentioned at any desired stage of their manufacture. The dyestuff pastes thus obtainable, containing the dyestuff in a reduced form (in the case of applying a rather weak alkali, such as ammonia, soda or potash probably in the form of the free leuco acid), likewise do not deposit, do not congeal, do not form crusts, and possess for printing purposes similar advantages as the preparations mentioned before.

Besides the anthraquinone sulphonic or carboxylic acids and/or their reduction products above specified, so-called hydrotropically acting agents, may be added. Under the term "hydrotropically acting agents" I understand compounds promoting the solubility of water insoluble or difficultly soluble substances in water (compare Neuberg, Biochemische Zeitschrift vol. 76, (1916) page 107 ff.; Tamba, Biochemische Zeitschrift, vol. 145 (1924) page 415 ff.; Neuberg, Sitzungsberichte der königl. preuss. Akademie der Wissenschaft (1916). Suitable hydrotropically acting agents are for example:—urea, substituted ureas, thiourea, hexamethylenetetramine, the ammonium or alkali metal salts of the following acids:—benzoic acid, salicylic acid, the benzene sulphonic acids, para-toluene sulphonic acid, naphthalene sulphonic acids, e. g. naphthalene-1- or -2-sulphonic acid, aniline sulphonic acids and substitution products thereof, such as for example, dimethylmetanilic acid, dimethyl-2-toluidine-4-sulphonic acid, dimethyl-4-aminobenzoic acid, alkali metal salts of hydroaromatic carboxylic and sulphonic acids, as for example, the cyclohexane carboxylic acid, tetrahydronaphthalene-beta-sulphonic acid and the like.

It may be mentioned that the hydrotropically acting agent to be used in a particular case will depend on the nature of the dyestuff to be printed as well as on the printing method applied.

Instead of the pure anthraquinone sulphonic or carboxylic acids mixtures of the same can be applied, for example, the technical mixture of 2.6- and 2-7-anthraquinone-disulphonic acid. Also anthraquinone sulphonic or carboxylic acids being substituted by monovalent substituents such as halogen atoms, amino groups, alkyl groups, hydroxy groups etc. are operable.

For printing purposes the preparations described above are worked up to printing colors in any desired manner. For example, the dry preparations may be made up to aqueous pastes, suitably in the presence of glycerine, ethylene glycol or another similar water soluble polyvalent alcohol, a thickening composition is added, furthermore caustic soda solution and sodium hydrosulphite, and the mixture heated to 60° C., until the dyestuff has dissolved in the form of its leuco derivative. After cooling, sodium formaldehydesulphoxylate and potassium carbonate are stirred into the mixture. Cotton or another suitable textile product is printed with this printing color, the printings are steamed, for example, in a Mather-Platt apparatus, and developed by a treatment with suitable oxidizing agents, such as oxygen (air), potassium bichromate and acetic acid and the like. Finally, the printings are soaped while boiling.

Another method of printing with my preparations will be as follows:—

The powdery preparations are made up to an aqueous paste, a thickening agent, glycerine, potassium carbonate and sodium formaldehydesulphoxylate are added, and textile products are printed with these printing colors, containing the dyestuff in the unreduced state. The printings are steamed, whereby reduction of the dyestuff occurs, and further treated as described above. Instead of the powdery preparations the aqueous pastes thereof, which may contain glycerine, ethylene glycol, thiodiglycol or another similar polyvalent alcohol may be applied whereby a further addition of an alcohol of the type mentioned, when preparing the printing colors will be unnecessary in many cases, but necessary in other cases, mainly depending on the type of dyestuff applied. According to this process also my dyestuff preparations, obtained by reducing the dyestuffs in the presence of water, glycerine or another similar polyvalent alcohol and an alkali, preferably one, which is weaker than caustic alkali solutions, such as ammonia, sodium carbonate, potassium carbonate etc. may be worked up to printing colors and applied for printing purposes. It may be mentioned that also in this case the addition of a suitable reducing agent, such as sodium formaldehydesulphoxylate, and of an alkali, and in most cases of glycerine thiodiglycol or another similar polyvalent alcohol to the printing color will be necessary or at least advantageous in order to obtain the best results.

The following examples illustrate the invention without limiting it thereto:—

Example 1

A printing paste produced from:—
20 grams of 6.6'-diethoxy-2.2'-bis-thionaphtheneindigo (13% aqueous paste)
4 grams of glycerine
4 grams of the potassium salt of anthraquinone-1-sulphonic acid and
72 grams of a thickening agent of the following composition:—
60 grams of wheat starch
150 grams of water
60 grams of British gum powder
260 grams of industrial gum 1:1
170 grams of tragacanth 65:1000
150 grams of potassium carbonate and
150 grams of sodium formaldehydesulphoxylate 1000 grams is used for printing in the customary manner. The prints are steamed while wet and developed by means of potassium bichromate and acetic acid and soaped at the boil. Cotton goods printed in this manner are considerably stronger than those, which are printed under the same conditions but without the addition of the potassium salt of anthraquinone-1-sulphonic acid. Furthermore a deep print is more quickly produced, that is to say, the fastness of fixation is considerably improved.

The potassium salt of the anthraquinone-1-sulphonic acid can be replaced by other sulphonic acids and carboxylic acids of the anthraquinone series, for example, by the sodium salt of anthraquinone-2-sulphonic acid, the sodium salt of an anthraquinone-disulphonic acid or anthraquinone-2-carboxylic acid.

Example 2

When the dyestuff of Example 1 is replaced by that obtainable from naphthohydroxythionaphthene-carboxylic acid by oxidation in alkaline solution as described in Example 1 of U. S. Patent 888,852, dyestuff pastes are obtained with the addition of the sodium salt of anthraquinone-2-sulphonic acid or the sodium salt of anthraquinone-2.7-disulphonic acid, which fix in a short time when applied for printing.

Example 3

The addition of anthraquinone-2-carboxylic acid to the printing paste of Example 1 causes an increase in the intensity of the shade when 3.4.8.9-dibenzopyrenequinone or dichloroisoviolanthrone are employed.

Example 4

When the dyestuff described in Example 1 is replaced by di-para-anisoyl-1.5-diamino-4,8-dihydroxyanthraquinone, and 2.6-dihydroxyanthraquinone-3.7-disulphonic acid (obtainable by sulphonation of anthraflavic acid with a fuming sulphuric acid of 20% strength at 120° C.) is added, deeper prints are likewise obtained with better fixation than without the addition of the 2.6 - dihydroxyanthraquinone - 3.7 - disulphonic acid.

Example 5

A mixture of:—

20 grams of an equeous paste of 6.6'-diethoxy-2.2'-bisthionaphtheneindigo
40 grams of crude glycerine 88% and
2 grams of the potassium salt of anthraquinone-1-sulphonic acid is reduced at a temperature of 70° C. with
50 grams of ammonia 25% and
10 grams of a hydrosulphite.

If desired, 5–10 grams of the sodium salt of benzene sulphonic acid or an equal quantity of another hydrotropically acting agent can be added. The mixture is then evaporated, until the paste shows a dyestuff content of 13%. When cotton goods are printed with this paste in the customary manner, considerably brighter shades are obtained, even after a short steaming, than by using an aqueous paste of the same dyestuff without the addition of the above named potassium salt.

Furthermore, in the case of slop-padding with subsequent steaming in the Mather-Platt, in particular when the process is carried out without preliminary reduction, it is found that the pastes thus produced yield more even and deeper printings than the aqueous paste without the specified additions. In this case the anthraquinone derivatives mentioned in Example 1 can likewise be used.

In this example the 6.6'-diethoxy-2.2'-bisthionaphtheneindigo can be replaced by other dye-stuffs, for example, 6.6'-dichloro-4.4'-dimethylbisthionaphtheneindigo.

Example 6

10 parts by weight of a dyestuff paste containing in every 100 parts by weight 20 parts by weight of 6.6'-dichloro-4.4'-dimethylbisthionaphtheneindigo, 5 parts by weight of the sodium salt of dimethylsulphanilic acid, 40 parts by weight of glycerine, 2 parts by weight of 2.6-dihydroxyanthraquinone-3.7-disulphonic acid or anthraquinone-2-carboxylic acid, are mixed with 10 parts by weight of water and 80 parts by weight of a thickening, containing the materials mentioned in Example 1, but with the difference that instead of 260 parts by weight of gum 1:1—160 parts by weight of the same and 100 parts by weight of glycerine are employed. The resulting printing paste is applied in the customary manner and the print is developed as described above. Cotton goods which are printed in this manner are considerably stronger than when printed with the same preparation but without the addition of the anthraquinone derivatives specified.

Example 7

A printing paste is prepared by mixing together in the usual manner:—

20 parts by weight of the dyestuff described in Col. Ind. No. 969 in form of a 30% aqueous paste
5 parts by weight of thiodiglycol
3 parts by weight of the sodium salt of benzylsulphanilic acid
4 parts by weight of water
5 parts by weight of caustic soda solution 40° Bé.
4 parts by weight of anhydrous sodium carbonate
1 part by weight of anthraquinone-alpha- or -beta-sulphonic acid or -alpha- or -beta-carboxylic acid or an alkali metal salt thereof
4 parts by weight of sodium hydrosulphite conc. powder
9 parts by weight of sodium formaldehydesulphoxylate
45 parts by weight of a thickening composition containing in 100 parts by weight
35 parts by weight of British gum powder
13 parts by weight of wheat starch and
2 parts by weight of the sodium salt of benzylsulphanilic acid.

Printings obtained by means of this printing paste are stronger and better fixed than printings obtained with the same printing paste without the addition of anthraquinone-alpha- or beta-sulphonic acid or anthraquinone-alpha- or -beta-carboxylic acid.

Example 8

A printing paste is prepared in the usual manner from:—

6 parts by weight of Indocarbon CL (Colour Index Suppl. page 43)
6 parts by weight of thiodiglycol
10 parts by weight of caustic soda solution 40° Bé.
3 parts by weight of anhydrous sodium carbonate
1 part by weight of anthraquinone-alpha- or -beta-sulphonic acid
3 parts by weight of the sodium salt of sulphanilic acid
15 parts by weight of water
20 parts by weight of grape sugar 1:1
6 parts by weight of sodium formaldehyde suphoxylate
30 parts by weight of a thickening composition containing in 100 parts:—
35 parts by weight of British gum powder
13 parts by weight of wheat starch
2 parts by weight of the sodium salt of benzylsulphanilic acid.

Printings obtained with this paste are stronger and fix better than printings obtainable with the same printing paste not containing anthraquinone-alpha- or -beta-sulphonic acid.

Example 9

40 parts by weight of Indocarbon CL powder (Colour Index Suppl. page 43) are reduced with 12 parts by weight of sodium hydrosulphite at 70° C. in the presence of 40 parts by weight of glycerine, 30 parts by weight of water and 4 parts of the sodium salt of anthraquinone-beta-carboxylic acid. The mixture is heated on the water bath for one hour and diluted with water to a dyestuff content of 20–30%. It may be mentioned that in this case reduction is performed in the absence of an alkali with the formation of a reduced dyestuff paste of especially great stability. However, if desired, 60 parts by weight of aqueous ammonia of 25% strength may be added before the reduction.

When applying this printing paste for cotton printing purposes very strong and well fixed printings are produced.

I claim:—

1. A vat dye printing paste comprising a water-soluble polyhydric alcohol and a substance of the group consisting of anthraquinone carboxylic acids and alkali metal salts thereof.

2. A printing paste comprising a thioindigoid dye, glycerine, and a substance of the group consisting of anthraquinone carboxylic acids and alkali metal salts thereof.

HERMANN BERTHOLD.